(12) United States Patent
Chen et al.

(10) Patent No.: US 7,852,327 B2
(45) Date of Patent: Dec. 14, 2010

(54) DISPLAY APPARATUS AND CONTROL METHOD THEREOF

(75) Inventors: Han Feng Chen, Suwon-si (KR);
Oh-jae Kwon, Anyang-si (KR);
Sung-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 983 days.

(21) Appl. No.: 11/268,549

(22) Filed: Nov. 8, 2005

(65) Prior Publication Data

US 2006/0227249 A1 Oct. 12, 2006

(30) Foreign Application Priority Data

Apr. 11, 2005 (KR) .................. 10-2005-0030028

(51) Int. Cl.
*H04N 7/12* (2006.01)
(52) U.S. Cl. ........................ 345/204; 345/76
(58) Field of Classification Search ................. 345/204, 345/76, 600
See application file for complete search history.

(56) References Cited

U.S. PATENT DOCUMENTS

| | | |
|---|---|---|
| 6,853,682 B2 | 2/2005 | Min |
| 2003/0107564 A1* | 6/2003 | Miyazawa .................. 345/204 |
| 2004/0150590 A1* | 8/2004 | Cok et al. ...................... 345/76 |
| 2004/0155847 A1 | 8/2004 | Taoka et al. |
| 2005/0083345 A1* | 4/2005 | Higgins ...................... 345/600 |
| 2006/0038805 A1* | 2/2006 | Yun-Wen et al. ............ 345/204 |
| 2007/0103411 A1* | 5/2007 | Cok et al. ...................... 345/82 |
| 2007/0216616 A1* | 9/2007 | Stessen et al. ................ 345/84 |

FOREIGN PATENT DOCUMENTS

| | | |
|---|---|---|
| JP | 2002-351382 | 6/2002 |
| JP | 2002-351382 | * 12/2002 |
| JP | 2003-198922 | 7/2003 |
| JP | 2003-280600 | 10/2003 |
| JP | 2004-177575 | 6/2004 |
| JP | 2004-343645 | 12/2004 |
| KR | 2001-0093034 | 10/2001 |

* cited by examiner

*Primary Examiner*—Amare Mengistu
*Assistant Examiner*—Joseph G Rodriguez
(74) *Attorney, Agent, or Firm*—Roylance, Abrams, Berdo and Goodman LLP

(57) ABSTRACT

The present invention relates to a display apparatus comprising a display panel; a controller to analyze input video data into frequency components, and create first and second video data different in the frequency component from each other on the basis of analyzed results; and a panel driver to drive the created first and second video data to be displayed in sequence as images on the display panel. Thus, the present invention provides a display apparatus and a control method thereof, in which first video data and second video data are created by analyzing a frequency component of input video data and output in sequence, thereby decreasing a motion blur through a simple operation without hardware change.

24 Claims, 14 Drawing Sheets

FIG. 4B

| 2 | 2 | 2 | 2 | 2 | 2 | 3 | 3 | 5 | 6 | 4 | 2 | 4 | 7 | 2 | 5 | 8 |
|---|---|---|---|---|---|---|---|---|---|---|---|---|---|---|---|---|
| 2 | 2 | 2 | 2 | 2 | 2 | 3 | 3 | 5 | 6 | 4 | 2 | 4 | 7 | 2 | 5 | 8 |
| 2 | 2 | 2 | 2 | 2 | 2 | 3 | 3 | 5 | 6 | 4 | 2 | 4 | 7 | 2 | 5 | 8 |
| 2 | 2 | 2 | 2 | 2 | 2 | 3 | 3 | 5 | 6 | 4 | 2 | 4 | 7 | 2 | 5 | 8 |
| 5 | 5 | 5 | 5 | 5 | 5 | 2 | 4 | 7 | 2 | 3 | 3 | 5 | 6 | 4 | 5 | 4 |
| 7 | 7 | 7 | 7 | 7 | 7 | 3 | 2 | 4 | 7 | 2 | 5 | 8 | 7 | 2 | 7 | 5 |
| 4 | 4 | 4 | 4 | 4 | 4 | 5 | 4 | 7 | 2 | 5 | 6 | 4 | 5 | 4 | 4 | 8 |
| 7 | 7 | 7 | 7 | 7 | 7 | 4 | 5 | 7 | 2 | 3 | 3 | 5 | 6 | 4 | 5 | 4 |
| 4 | 4 | 4 | 4 | 4 | 4 | 4 | 7 | 2 | 5 | 8 | 4 | 4 | 8 | 2 | 5 | 8 |

DISPLAY APPARATUS AND CONTROL METHOD THEREOF

CROSS-REFERENCE TO RELATED APPLICATIONS

This application claims the benefit under 35 U.S.C. §119 (a) of Korean Patent Application No. 2005-0030028, filed on Apr. 11, 2005, in the Korean Intellectual Property Office, the entire disclosure of which is hereby incorporated by reference.

BACKGROUND OF THE INVENTION

1. Field of the Invention

The present invention relates to a display apparatus and a control method thereof. More particularly, the present invention relates to a display apparatus capable of decreasing a motion blur and a control method thereof.

2. Description of the Related Art

The cathode ray tube (CRT) has recently been replaced with new display systems. As an example of alternatives to the CRT, there is a liquid crystal display (LCD) which is being applied to televisions, computer monitors, and the like. Compared to the CRT, the LCD is relatively thin, flat and light-weight.

The CRT and the LCD are significantly different in their driving methods. In a CRT, very short light flashes are generated by phosphors and each image is displayed in a very small part of one frame period, which is called an impulse-type display. On the other hand, the LCD has a sample and hold characteristic that displays one image with the same red, green and blue (RGB) brightness maintained throughout the entire frame period, which is called a hold-type display.

LCDs have a motion blur problem because it has a long response time and the characteristic of the hold-type display. To fundamentally make the response time of the LCD faster, liquid crystal material and a cell design should be optimized. Currently, a kind of overdrive method based on a lookup table (LUT) has been adopted to alleviate the long response time problem. The overdrive method accelerates the response time of the liquid crystal. At present, many LCD panels can limit a gray level response time to 8 ms or below.

However, a motion blur remains in the LCD due to its characteristic of the hold-type display even though the response time approximates 0. To reduce the motion blur due to the characteristic of the hold-type display, various methods have been proposed.

In a straightforward method, an additional frame is inserted per two frames, thereby decreasing a frame period. However, this method requires that the additional frame inserted corresponding to an original frame should be predicted. Therefore, motion estimation and motion compensation are necessary for estimating the additional frame. This method is called a motion estimation and motion compensation (MEMC) method. However, due to prediction requirement this method is relatively difficult, and requires additional hardware components to implement.

Further, in a motion-compensated inverse filtering (MCIF) method, a motion blur is decreased without increasing a frame period. However, a low pass filter for a motion blur is a zero cross filter, so that it is practically impossible to implement an ideal inverse filter. In the MCIF method, a high frequency boost method is used in estimating an ideal inverse low pass filter, but an overshoot problem arises. Further, the MCIF method requires additional motion vector estimation hardware to be designed and implemented.

Also, there is a black insertion method for decreasing the motion blur due to the characteristic of the hold-type display. In the black insertion method, an output video frame has a period having half the duration of an input video frame. That is, two video frames are output in one period of an input video frame, and the two video frames include a first half frame corresponding to the input video frame, and a second half frame filled with the black signal. However, this black insertion method has a problem of low brightness. To enhance the brightness of a backlight module, the brightness must be compensated, but there arises problems in that a display panel should be redesigned and the temperature of the backlight module rises in order to compensate the brightness of the backlight module. The gray level of the first half frame between two frames can be doubled to maintain the brightness, but causes problems due to a gray level limit (0 through 255).

SUMMARY OF THE INVENTION

Accordingly, it is an aspect of the present invention to provide a display apparatus and a control method thereof, in which first video data and second video data are created by analyzing a frequency component of input video data and output in sequence, thereby decreasing a motion blur through a simple operation without requiring additional hardware.

Additional aspects and/or advantages of the invention will be set forth in part in the description which follows and, in part, will be obvious from the description, or may be learned by practice of the invention.

The foregoing and/or other aspects of the present invention are achieved by providing a display apparatus comprising a display panel; a controller to analyze input video data into frequency components, and create first and second video data different in the frequency component from each other on the basis of analyzed results; and a panel driver to drive the created first and second video data to be displayed in sequence as images on the display panel.

According to an aspect of the present invention, the controller comprises a high frequency calculator to filter a high frequency component from the input video data, and a video data creator to create the first video data by adding the high frequency component to the input video data and the second video data by subtracting the high frequency component from the input video data.

According to an aspect of the present invention, the high frequency calculator comprises a high pass filter.

According to an aspect of the present invention, the high frequency calculator comprises an area selector to select a predetermined area centered on a pixel of which the high frequency component is calculated, and the high-pass filter calculates the high frequency component of the pixel on the basis of video data corresponding to the selected area.

According to an aspect of the present invention, the high frequency calculator comprises a gain adjuster to adjust a gain value of the high frequency component on the basis of a predetermined gain value.

According to an aspect of the present invention, the high frequency calculator comprises a high frequency compensator to compensate the high frequency component by a predetermined limitation method.

According to an aspect of the present invention, the controller comprises a video data compensator to compensate at least one of the first video data and the second video data with reference to a predetermined lookup table.

According to an aspect of the present invention, the video data compensator compensates at least one of the first and second video data by an interpolation method with reference to the lookup table.

According to an aspect of the present invention, the panel driver drives the first and second video data to be processed at a double frame rate and output in sequence.

According to an aspect of the present invention, the display apparatus further comprises a first color space converter to convert the input video data to have a linear color space when the input video data has a nonlinear color space; and a second color space converter to convert the created first and second video data to have an original color space.

According to an aspect of the present invention, the display apparatus further comprises a video data duplicator to duplicate the input video data.

The foregoing and/or other aspects of the present invention are achieved by providing a method of controlling a display apparatus, the method comprising the steps of analyzing input video data into frequency components, creating first and second video data different in the frequency component from each other on the basis of analyzed results; and outputting the created first and second video data in sequence.

According to an aspect of the present invention, the creating the first and second video data step comprises filtering a high frequency component from the input video data, wherein the first video data is created by adding the high frequency component to the input video data and the second video data is created by subtracting the high frequency component from the input video data.

According to an aspect of the present invention, the filtering the high frequency component step comprises selecting a predetermined area centered on a pixel of which the high frequency component is calculated, wherein the high frequency component of the pixel is calculated on the basis of video data corresponding to the selected area.

According to an aspect of the present invention, the method further comprises adjusting a gain value of the high frequency component on the basis of a predetermined gain value.

According to an aspect of the present invention, the method further comprises compensating the high frequency component by a predetermined limitation method.

According to an aspect of the present invention, the method further comprises compensating at least one of the first video data and the second video data with reference to a predetermined lookup table.

According to an aspect of the present invention, the compensating at leas one of the first and second video data step comprises compensating at least one of the first and second video data by an interpolation method with reference to the lookup table.

According to an aspect of the present invention, the first and second video data is processed at a double frame rate and outputted in sequence.

According to an aspect of the present invention, the method further comprises converting the input video data to have a linear color space when the input video data has a nonlinear color space, wherein the creating the first and second video data step comprises converting the created first and second video data to have an original color space.

According to an aspect of the present invention, the method further comprises duplicating the input video data.

The foregoing and/or other aspects of the present invention are achieved by providing a method of controlling a display apparatus, comprising analyzing input video data into an AC component and a DC component; creating first video data by adding the DC component to the doubled AC component, and second video data with the DC component; and sequentially outputting the first and second video data processed at a double frame rate.

According to an aspect of the present invention, the analyzing the input video data into the AC component and the DC component comprises selecting a predetermined area centered on a corresponding pixel, and the DC component of the pixel is calculated on the basis of video data corresponding to the selected area, and the AC component is calculated by subtracting the calculated DC component from the input video data.

According to an aspect of the present invention, the analyzing the input video data into the AC component and the DC component step comprises compensating the calculated DC and AC components by a predetermined limitation method.

BRIEF DESCRIPTION OF THE DRAWINGS

These and other aspects and advantages of the present invention will become apparent and more readily appreciated from the following description of the embodiments, taken in conjunction with the accompany drawings of which:

FIGS. 4A and 4B show windows for illustrating a selection area of an area selector according to an embodiment of the present invention;

Throughout the drawings, like reference numbers should be understood to refer to like elements, structures and features.

DETAILED DESCRIPTION OF EXEMPLARY EMBODIMENTS

Reference will now be made in detail to exemplary embodiments of the present invention, examples of which are illustrated in the accompanying drawings. The embodiments are described below so as to explain the present invention by referring to the figures.

Figure 1:
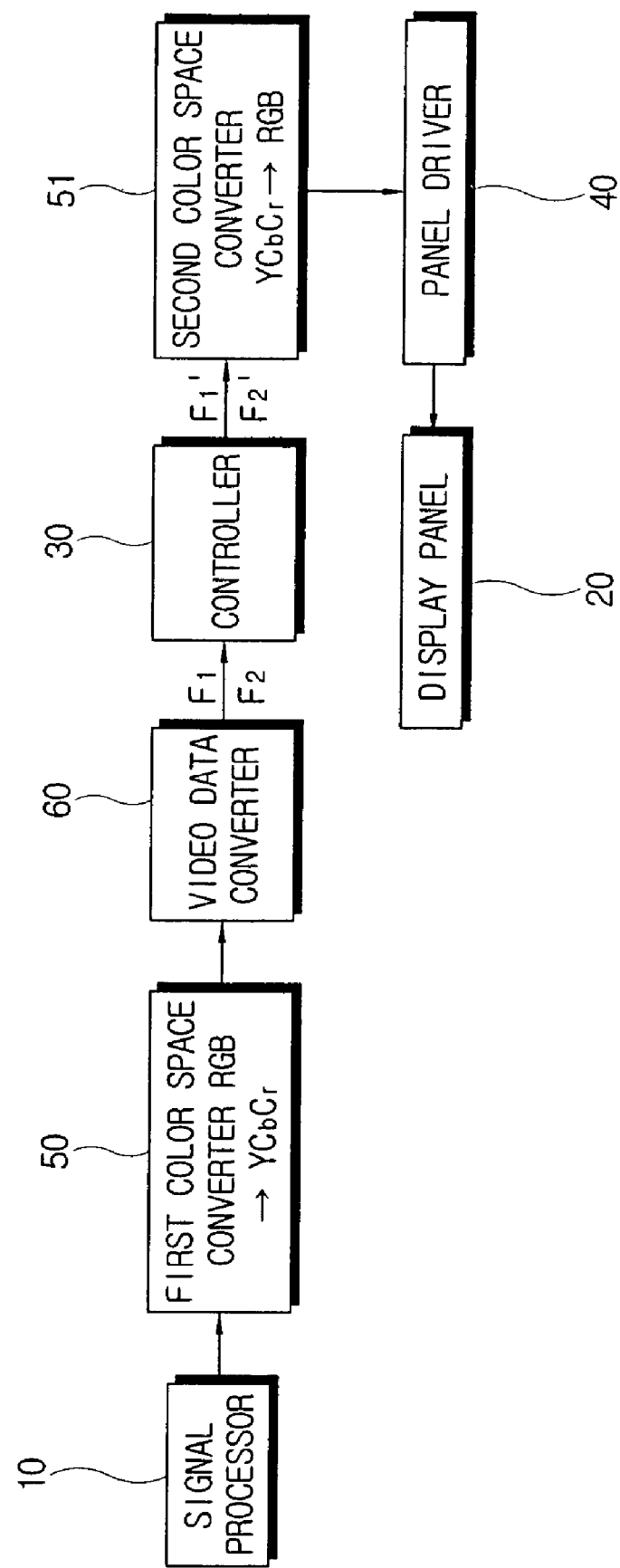
FIG. 1 is a control block diagram of a display apparatus according to an embodiment of the present invention.

FIG. 1 is a control block diagram of a display apparatus according to an embodiment of the present invention.

As shown in FIG. 1, a display apparatus according to an embodiment of the present invention comprises a signal processor 10, a display panel 20, a controller 30, and a panel driver 40.

The signal processor 10 processes video data input to the display apparatus. Here, the signal processor 10 converts the input video data to have a format compatible with the panel driver 40. According to an embodiment of the present invention, the signal processor 10 comprises a scaler to scale the video data, and a signal converter to convert the input video data to be compatible with the scaler. Here, the signal converter may include an analog/digital converter, a video decoder, a tuner or the like according to the formats of the video data received.

The display panel 20 displays the video data according to control of the panel driver 40. According to an embodiment of the present invention, the display panel 20 is an LCD panel. Alternatively, the display panel 20 may include any display panel technology having a motion blur characteristic while displaying an image, such as a plasma display panel (PDP).

The controller 30 analyzes a frequency component of the video data processed through the signal processor 10, and creates first and second video data on the basis of analyzed results. According to an embodiment of the present invention, the controller 30 can be achieved by a signal processor chip.

Here, the video data means data corresponding to a unit frame, and each video data is preferably processed sequentially and independently.

The controller 30 analyzes the frequency component per pixel, and creates the first video data and the second video data, which are different from the input video data and different in the frequency component from each other, through a high frequency component analysis, a low frequency component analysis, an alternating current (AC) component analysis, a direct current (DC) component analysis, and the like.

The method of analyzing the frequency component and the method of creating the new video data may vary as long as it can increase or decrease the high frequency component of the input video data, of which detailed examples will be described later.

The controller 30 according to an embodiment of the present invention can be operated according to various color spaces. For example, the video data can be processed in a color space such as an RGB space, a YCbCr space, and so on. In the case of the RGB space, the video data is divided and processed according to R, G and B color channels. In the case of the YCbCr space, the controller 30 either operates in all Y, Cb and Cr channels or alternately only the Y channel related to the brightness because a human's eye is more sensitive to brightness rather than to color. Below, the Y channel will be exemplarily described.

The panel driver 40 sequentially outputs the first video data and the second video data to be displayed on the display panel 20. At this time, the panel driver 40 drives a frame rate of the output video data to double that of the input video data.

Thus, the first video data and the second video data different in the frequency components from each other are created from the input video data, so that the motion blur is decreased.

As shown in FIG. 1, the display apparatus according to an embodiment of the present invention further comprises a first color space converter 50 and a second color space converter 51. Here, the first and second color space converters 50 and 51 can be achieved by signal processor chips.

The first color space converter 50 changes the video data to have a linear color space when the input video data has a nonlinear color space. According to an embodiment of the present invention, the YCbCr space is used as the color space. Thus, when an RGB signal is input by way of example, the first color space converter 50 converts the RGB signal into a YCbCr signal.

The second color space converter 51 converts the color space of the first and second video data created through the controller 30 into their original color spaces.

Further, the display-apparatus according to an embodiment of the present invention further comprises a video data duplicator 60. Here, the video data duplicator 60 duplicates the input video data to get video data $F_1$ and $F_2$, thereby making the same video data as the original input video data. Then, the controller 30 creates the video data $F_1'$ and $F_2'$, which are different in the frequency component, on the basis of the duplicated video-data $F_1$ and $F_2$.

Below, a method of controlling the display apparatus according to an embodiment of the present invention will be described with reference to FIG. 2. Throughout the specification, repetitive descriptions will be avoided.

Figure 2:
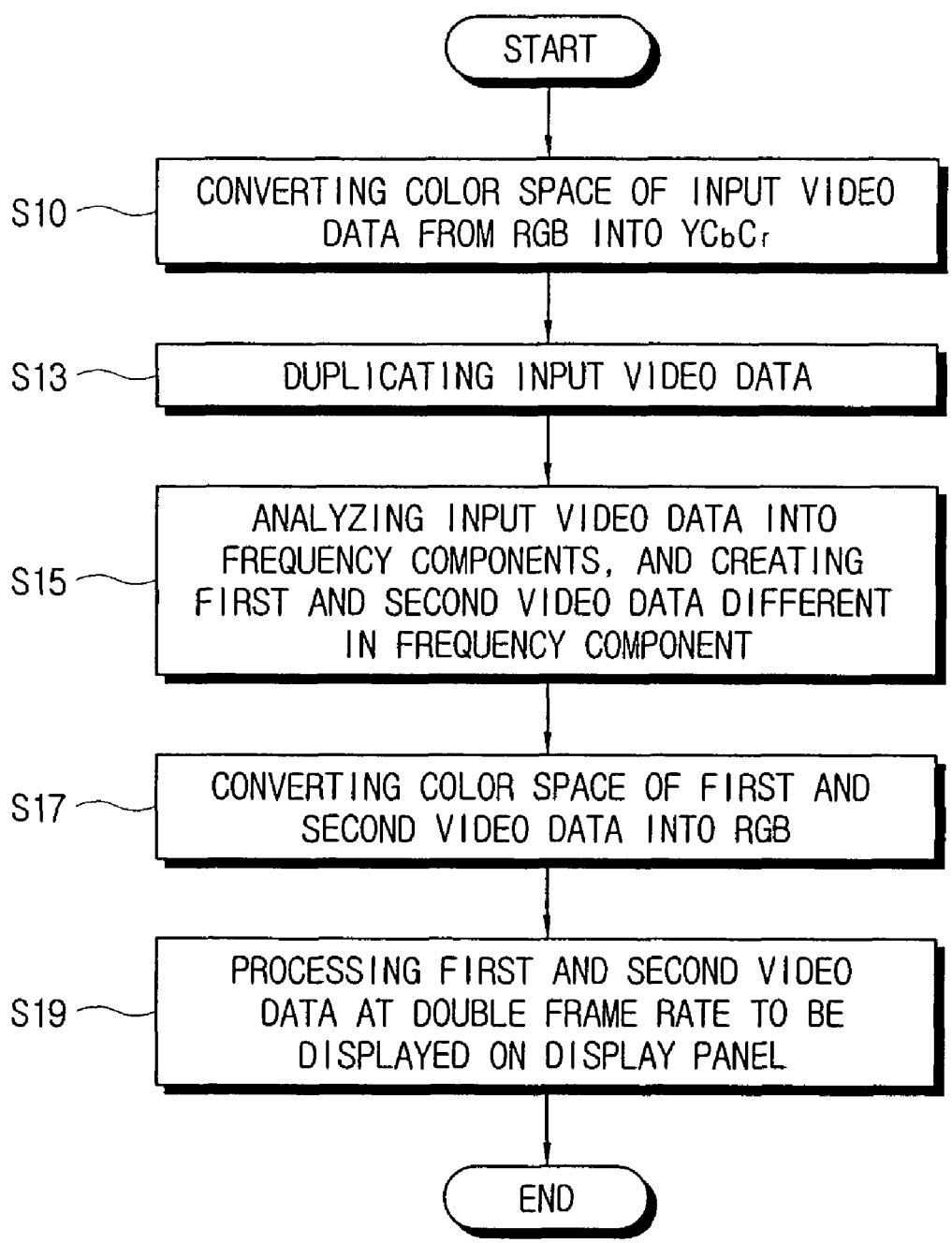
FIG. 2 is a control flowchart of a display apparatus according to an embodiment of the present invention.

As shown in FIG. 2, when the input video data has a nonlinear color space, at operation S10, the first color space converter 50 converts the nonlinear color space into a linear color space.

At operation S13, the video data duplicator 60 duplicates the video data changed by the first color space converter 50, and outputs the same video data $F_1$ and $F_2$ as the input video data. At operation S15, the controller 30 creates the video data $F_1'$ and $F_2'$, which are different in the frequency component, on the basis of the duplicated video data $F_1$ and $F_2$.

At operation S17, the second color space converter 51 makes the first and second video data created by the controller 30 have their original color space. At operation S19, the panel driver 40 outputs the created first and second video data $F_1'$ and $F_2'$ by doubling the frame rate of the input video data, thereby driving the created first and second video data $F_1'$ and $F_2'$ to be displayed on the display panel 20.

Now the controller 30 of the display apparatus according to an embodiment of the present invention will be described with reference to FIGS. 3A through 5C, with regard to the Y channel of the color space.

Figure 3A:
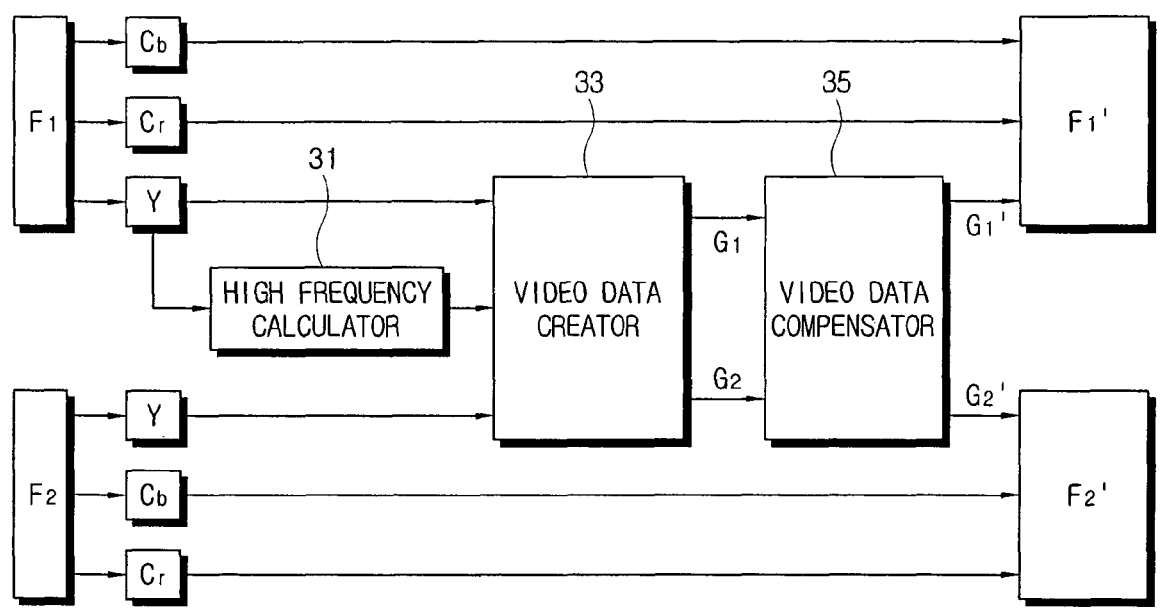
FIGS. 3A and 3B are block diagrams for illustrating a video data creating method of a controller according to an embodiment of the present invention.

As shown in FIG. 3A, the controller 30 of the display apparatus according to an embodiment of the present invention comprises a high frequency calculator 31 to calculate the high frequency component of the video data on the basis of the Y channel of the first and second video data $F_1$ and $F_2$ that is duplicated by the video data duplicator 60 and has the Y, Cb and Cr channels; and a video data creator 33 to create new video data $G_1$ by adding the high frequency component calculated by the high frequency calculator 31 to a Y component of the input video data and create new video data $G_2$ by subtracting the high frequency component from the Y component of the input video data.

Here, the reason why the high frequency component is added and subtracted to create the new video data is because the motion blur is rarely affected with a low frequency component between the high and low frequency components of the input video data. To reduce the motion blur, the first video data is increased in the high frequency component, and the second video data has the low frequency component, which are displayed in sequence.

Figure 3B:
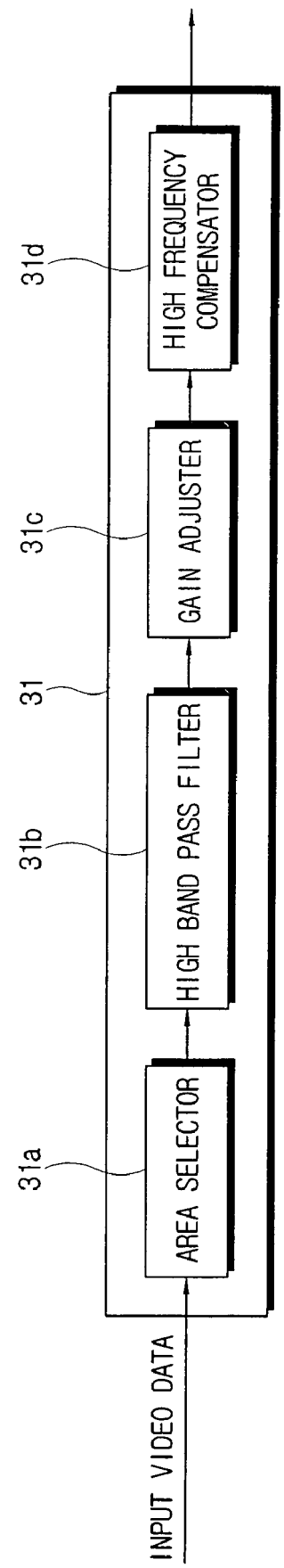

As shown in FIG. 3B, the high frequency calculator 31 includes a high pass filter 31b. Here, the method of calculating the high frequency component may vary according to designs of the filter.

The high pass filter 31b filters the high frequency component from the Y channel of each pixel. That is, the high pass filter 31b filters the high frequency component from the video data. Here, the pixel arrayed in an i column and a j row will be expressed as P(i,j), and its high frequency component will be expressed as HFC(i,j).

Further, the high frequency calculator 31, as shown in FIG. 3b, includes an area selector 31a to select an area for calculating the high frequency component HFC(i,j) of each pixel. Here, the size of the selected area may vary according to designs of the selector.

Figure 4A:
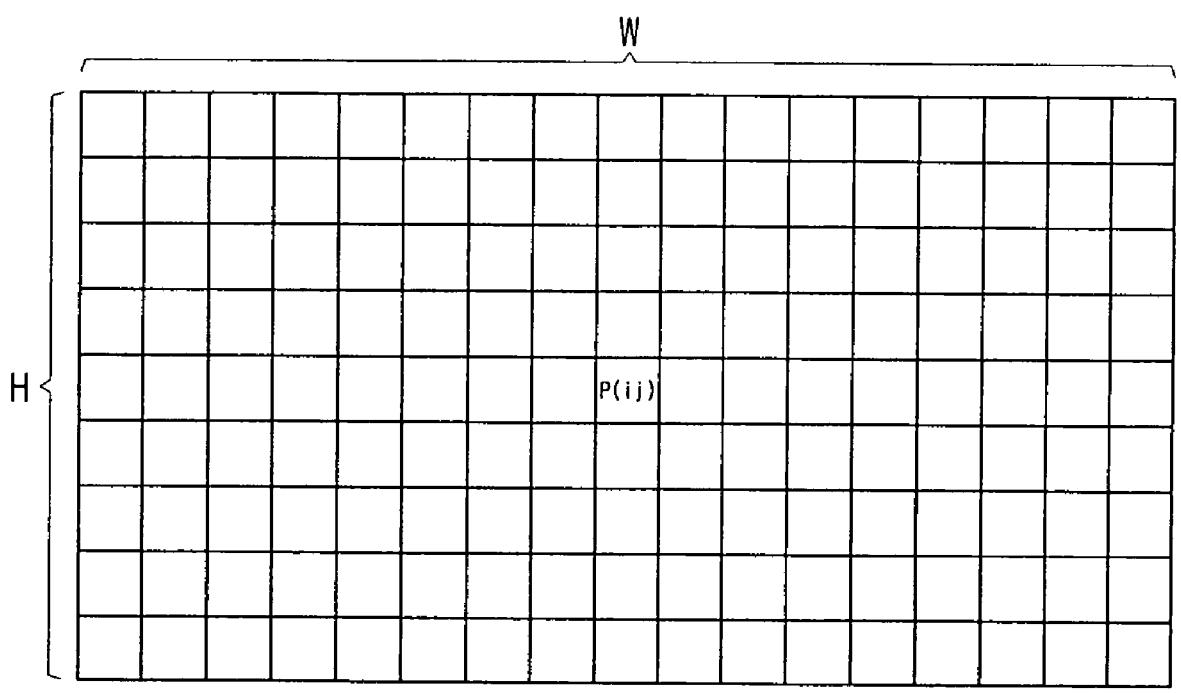

As shown in FIG. 4A, the area selected by the area selector 31a has a width W and a height H, centered on the pixel P(i,j) in a window corresponding to the selected area.

In the area selected by the area selector 31a, the location of the pixel P(i,j) can be expressed as follows.

$$RP\{P(i+m,j+n)|-(H+1)+/2<m<(H+1)/2, -(W+1)/2<n<(w+1)/2\}$$

In the case where P(i+m,j+n) locates out of an image border, P(i+m,j+n) is as shown in FIG. 4B, replaced by a spatially nearest pixel within the video data. In FIG. 4B, a gray area indicates an area where an image based on the video data is displayed on the display panel 20, and a white area indicates an outside area. At this time, the high band pass filter 31b is operated depending on the location of the selected pixel. The high pass filter 31b can be expressed as follows.

$$Fh\{S(m,n)|-(H+1)+/2<m<(H+1)/2, -(W+1)/2<n<(w+1)/2\}$$

where, the S(m,n) means a weight of each filter tap

The high pass filter 31b is operates as follows.

$$HFC(i, j) = \frac{\sum_{\substack{P(i+m,j+n)\in R_p \\ S(m,n)\in F_h}} (Y_{or}(i+m, j+n) \times S(m, n))}{\sum_{S(m,n)\in F_h} S(m, n)}$$

where, $Y_{or}(i,j)$ indicates the Y component of the input video data corresponding to the pixel P(i,j). Further, the filter size of W and H, and various filter coefficient S(m,n) can be designed variously.

For reference, a performance of the filter is determined by the number of filter taps and the weight of each tap. The more filter taps the filter has, the more the high frequency component is obtained. Because the high frequency component is required in proportion to motion speed, the number of filter taps is very important. According to an exemplary embodiment, the ideal size of the filter for decreasing the motion blur should be larger than twice the maximum motion speed.

As shown in FIG. 3B, the high frequency calculator 31 according to an embodiment of the present invention further comprises a gain adjuster 31c. The gain adjuster 31c can adjust the increment of the high frequency component.

That is, the gain adjuster 31c makes HFC'(i,j) filtered by the high pass filter 31b go into overdrive as follows.

$$HFC'(i,j)=\alpha*HFC(i,j)$$

Where, α is a gain value for controlling overdrive degree.

As the gain value increases, the limitation of the gray level may be exceeded. Preferably, the gain value ranges from 0.5 to 1.5. Further, the gain value may be adjustable by a user. Thus, the display apparatus according to an embodiment of the present invention may provide a user with a user interface for adjusting the gain value.

As shown in FIG. 3B, the high frequency calculator 31 according to an embodiment of the present invention further includes a high frequency compensator 31d to prevent the gray level from exceeding a maximum level.

The high frequency compensator 31d compensates HFC'(i,j) adjusted in the gain value in consideration of a predetermined limitation method. Because the gray level has a limitation, that is, the gray level is limited to 0~255 in the case of an 8 bit representation, the high frequency compensator 31d checks and compensates HFC'(i,j) on the basis of the following rule for preventing the overflow.

$$If\ HFC'(i,j)+Y_{or}(i,j)>255,\ HFC'(i,j)=255-Y_{or}(i,j)$$

$$If\ HFC'(i,j)+Y_{or}(i,j)<0,\ HFC'(i,j)=0-Y_{or}(i,j)$$

As shown in FIG. 3A, the video data creator 33 adds HFC'(i,j) calculated by the high frequency calculator 31 to the duplicated video data $F_1$, and subtracts HFC'(i,j) from the duplicated video data $F_2$, thereby creating the first video data and the second video data as follows.

$$G_1(i,j)=Y_{or}(i,j)+HFC'(i,j)$$

$$G_2(i,j)=Y_{or}(i,j)-HFC'(i,j)$$

As described above, the motion blur is rarely affected with the low frequency component of the video data. According to an embodiment of the present invention, the first video data having the doubled high frequency component and the second video data having only the low frequency component without the high frequency component are created and displayed in sequence, so that a hold-type display can operate like an impulse-type display. According to an embodiment of the present invention, the motion blur is reduced at least in half.

As shown in FIG. 3A, the controller 30 of the display apparatus according to an embodiment of the present invention further includes a video data compensator 35. The frame rate of the output video data doubles that of the input video data, so that the brightness of the pixel is not linear to the gray level. Therefore, there is necessity for compensating the brightness of the pixel through the video data compensator 35. The video data compensator 35 compensates the brightness of the pixel, referring to a predetermined lookup table (LUT). Here, the LUT may vary according to the specification of the display apparatus.

Figure 5A:
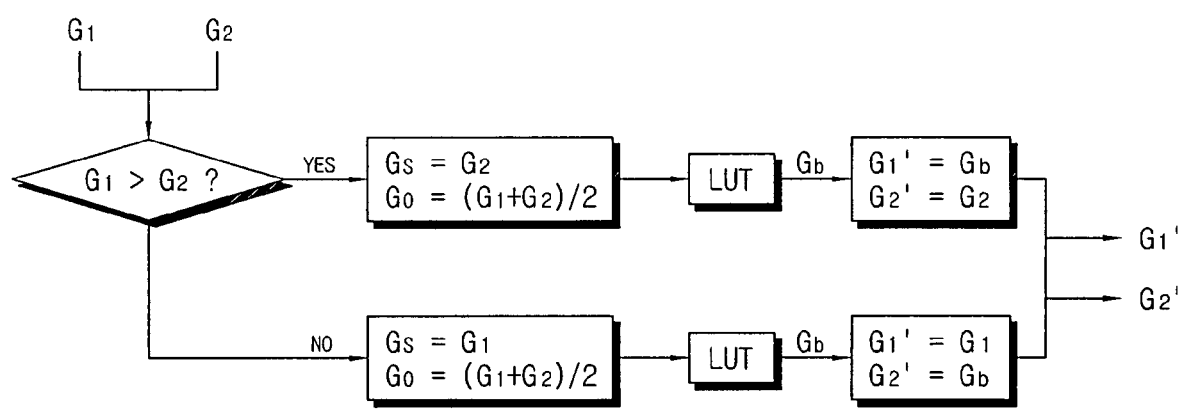
FIGS. 5A through 5C illustrate a compensating method of a video data compensator according to an embodiment of the present invention.

As shown in FIG. 5A, the video data compensator 35 receives $G_1(i,j)$ and $G_2(i,j)$ created by the video data creator 33, and selects the smaller one between $G_1(i,j)$ and $G_2(i,j)$. For purposes of illustration, let the selected one be $G_s(i,j)$, and $Y_{or}(i,j)$ be $G_o(i,j)$. At this time, the video data compensator 35 indexes $G_b(i,j)$ to $G_s(i,j)$ and $G_o(i,j)$, referring to a two-dimensional (2D)-LUT. Thus, $G_b(i,j)$, $G_1(i,j)$ and $G_2(i,j)$ are overdriven as $G_1'(i,j)$ and $G_2'(i,j)$.

$$If\ G_1(i,j)>G_2(i,j),\ G_1'(i,j)=G_b(i,j)\ \&\ G_2'(i,j)=G_s(i,j)$$

$$If\ G_1(i,j)<=G_2(i,j),\ G_1'(i,j)=G_s(i,j)\ \&\ G_2'(i,j)=G_b(i,j)$$

Figure 5B:
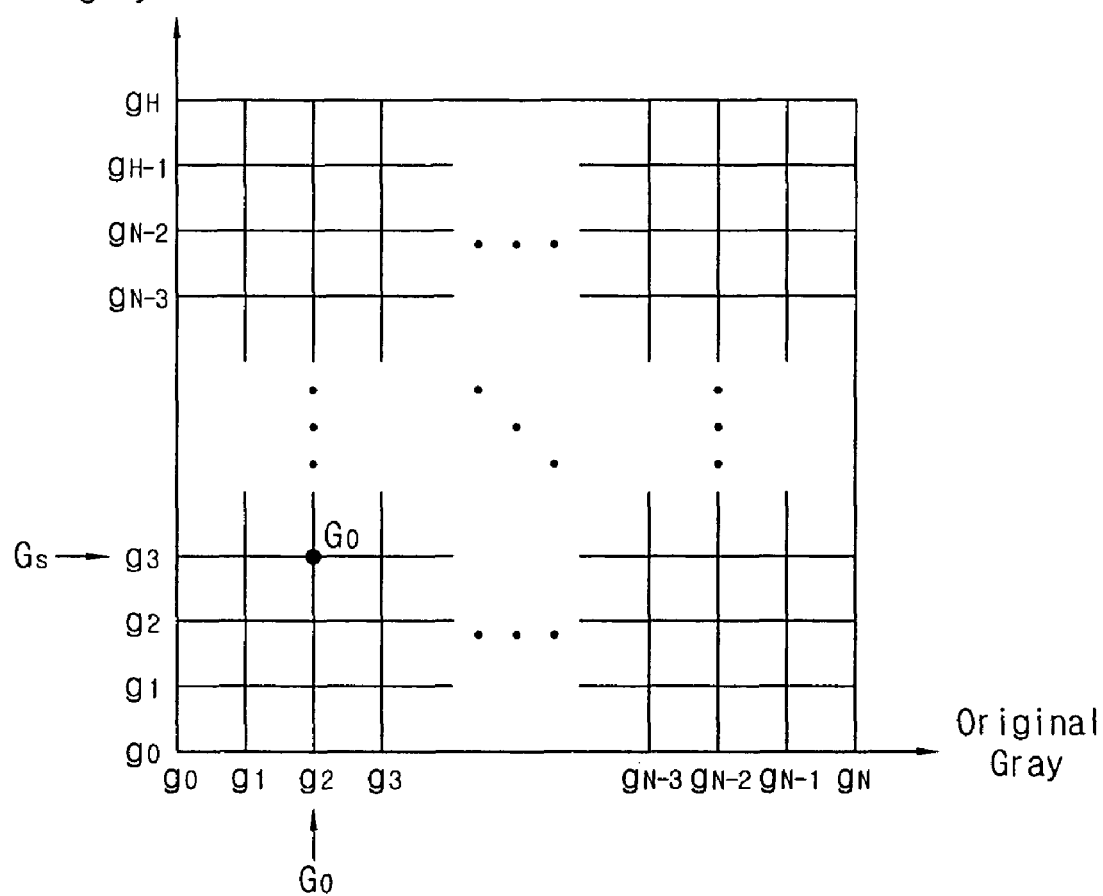

As shown in FIG. 5B, the 2D-LUT includes an original gray level $G_o(i,j)$ on a horizontal axis, and a smaller gray level $G_s(i,j)$ on a vertical axis. The LUT has a value equal to $G_b(i,j)$ satisfying that $G_s(i,j)$ and $G_b(i,j)$ displayed when the output frame rate doubles the input frame rate, and the visible brightness equal to that of the $G_o(i,j)$ in the input frame rate.

$G_b(i,j)$ can be initialized by a test.

Assuming that the size of the LUT is defined as N by N (N<=256), LUT(gm,gn) indicates an element at the $m^{th}$ row and the $n^{th}$ column of the LUT, and 0<=m,n<=N, gm=m*D, D=256/N, and if gm>255, gm=255.

If N=256, m and n always satisfy gm=$G_o(i,j)$ and gn=$G_s(i,j)$, where $G_b(i,j)$=LUT ($G_o(i,j)$, $G_s(i,j)$)).

When the size of the LUT is large as described above, that is, when the LUT has a size of 256 by 256 it produces simpler results, but requires more complicated hardware components. Therefore, the size of the LUT should be decreased to simplify the hardware components. Preferably, the LUT has a size of 64 by 64, 32 by 32, or 16 by 16.

Figure 5C:
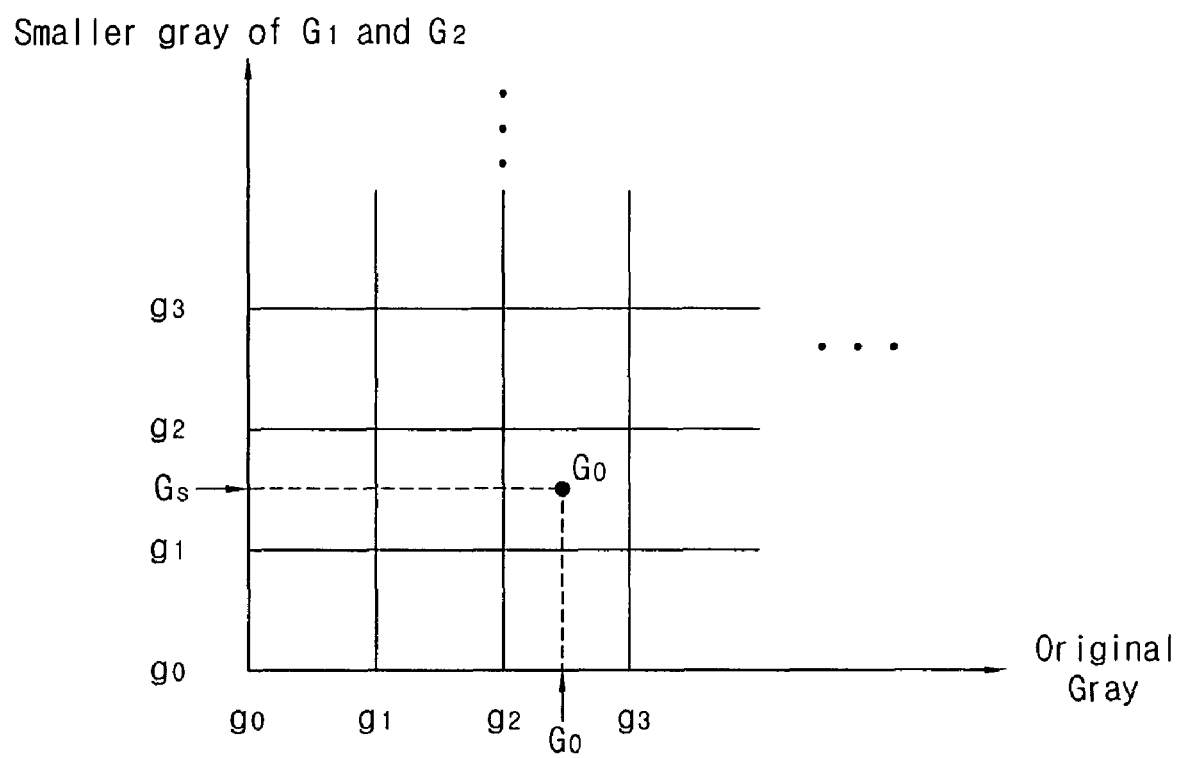
Figure 9:
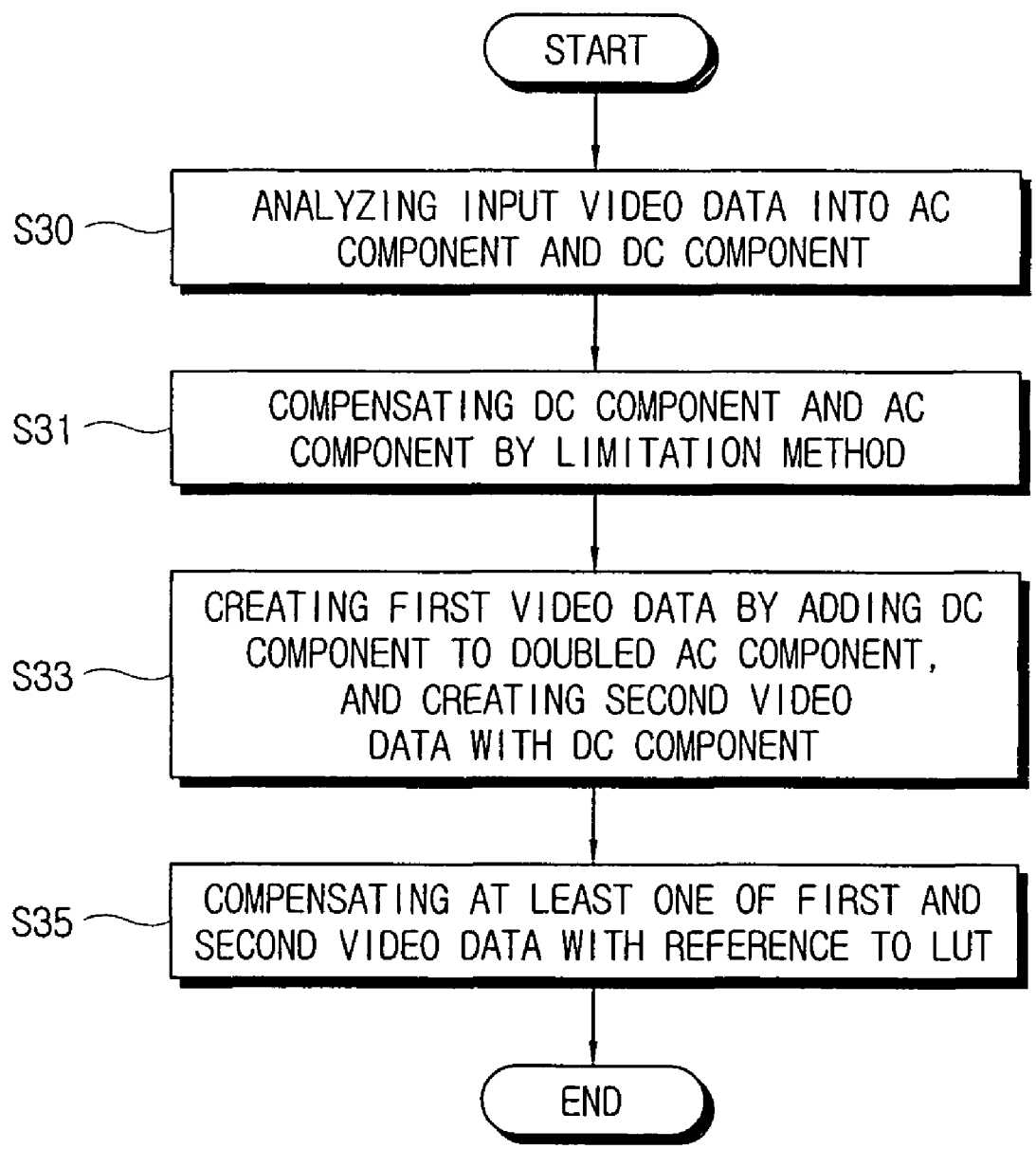
FIG. 9 is a control flowchart of a display apparatus according to an embodiment of the present invention.

As shown in FIG. 5C, when the size of the LUT is small, that is, if N<256, $gm < G_o(i,j) < gm+1$ or $gn < G_s(i,j) < gn+1$, $G_b(i,j)$ can not be indexed directly from the LUT (referring to FIG. 9).

In this case, $G_b(i,j)$ can be obtained by an interpolation method.

A bilinear interpolation method is as follows.

$$G_b(i,j) = \{LUT(gm,gn)*(gm+1-G_o(ij)))*(gn+1-G_s(i,j)) + LUT(gm+1,gn)*(G_o(i,j)-gm)*(gn+1-G_s(i,j)) + LUT(gm,gn+1)*(gm+1-G_o(i,j))*(G_s(i,j)-gn) + LUT(gm+1,gn+1)*(G_o(i,j)-gm)*(G_s(i,j)-gn)\}/\{(gm+1-gm)*(gn+1-gn)\}$$

After all $G_1(i,j)$ and $G_2(i,j)$ are overdriven into $G_1'(i,j)$ and $G_2'(i,j)$ through the video data compensator 35, $F_1$ and $F_2$ are converted into the first video data and the second video data different in the frequency component, that is, $F_1'$ and $F_2'$.

Figure 8:
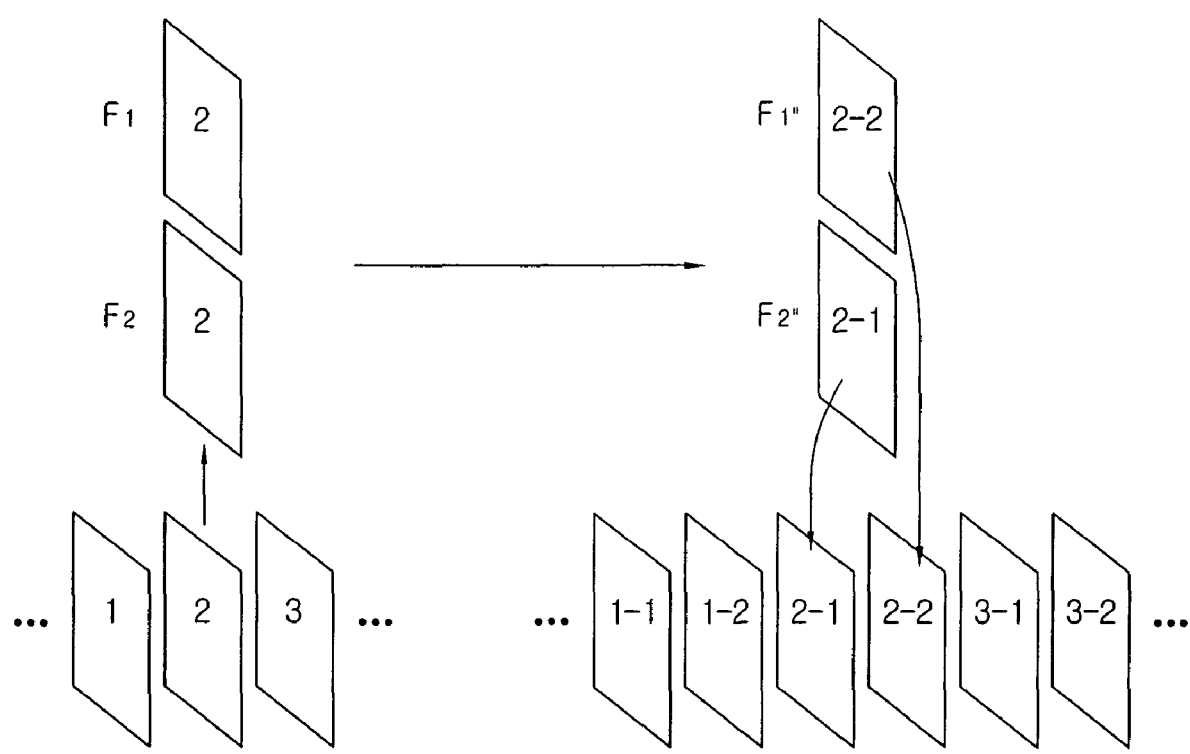
FIG. 8 schematically illustrates the output of first and second video data according to an embodiment of the present invention.

The first and second video data $F_1'$ and $F_2'$ created by the controller 30 are rearranged in output image sequence (refer to FIG. 8). Further, the first and second video data $F_1'$ and $F_2'$ are driven by the panel driver 40 to be displayed as images on the display panel 20.

Therefore, when a motion blur arises due to the input video data having a motion speed of V, the display apparatus according to an embodiment of the present invention can decrease the motion blur as much as the motion speed of the input video data is reduced to V/2.

Below, the method of creating the first and second video data in the controller 30 according to an embodiment of the present invention will be described with reference to FIGS. 6 and 7B.

Figure 6:
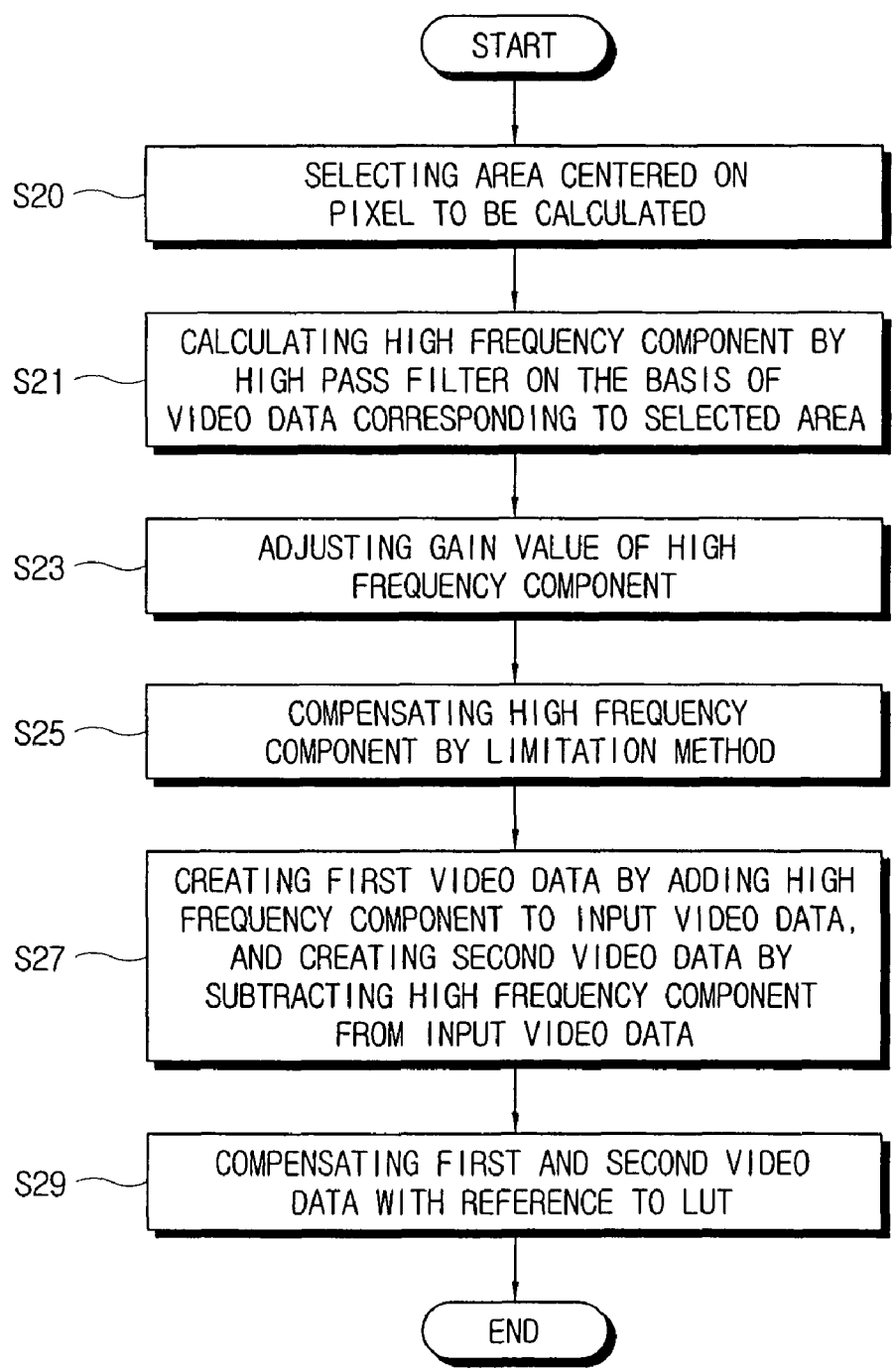
FIG. 6 is a control flowchart for illustrating the video data generating method of the controller according to an embodiment of the present invention.

As shown in FIG. 6, at operation S20, the area selector 31a of the high frequency calculator 31 selects an area required to calculate the high frequency component of a corresponding pixel on the basis of a preset size.

At operation S21, the video data corresponding to the selected area passes through the high pass filter 31b, so that the high frequency component of the pixel is calculated and thus the high frequency component is filtered from the frame video data per pixel.

At operation S23, the gain value of the filtered high frequency component is adjusted by the gain adjuster 31c on the basis of a preset gain value, and then, at operation S25, the adjusted high frequency component is checked and compensated by the limitation method for preventing the overflow of the gray level.

Figure 7A:
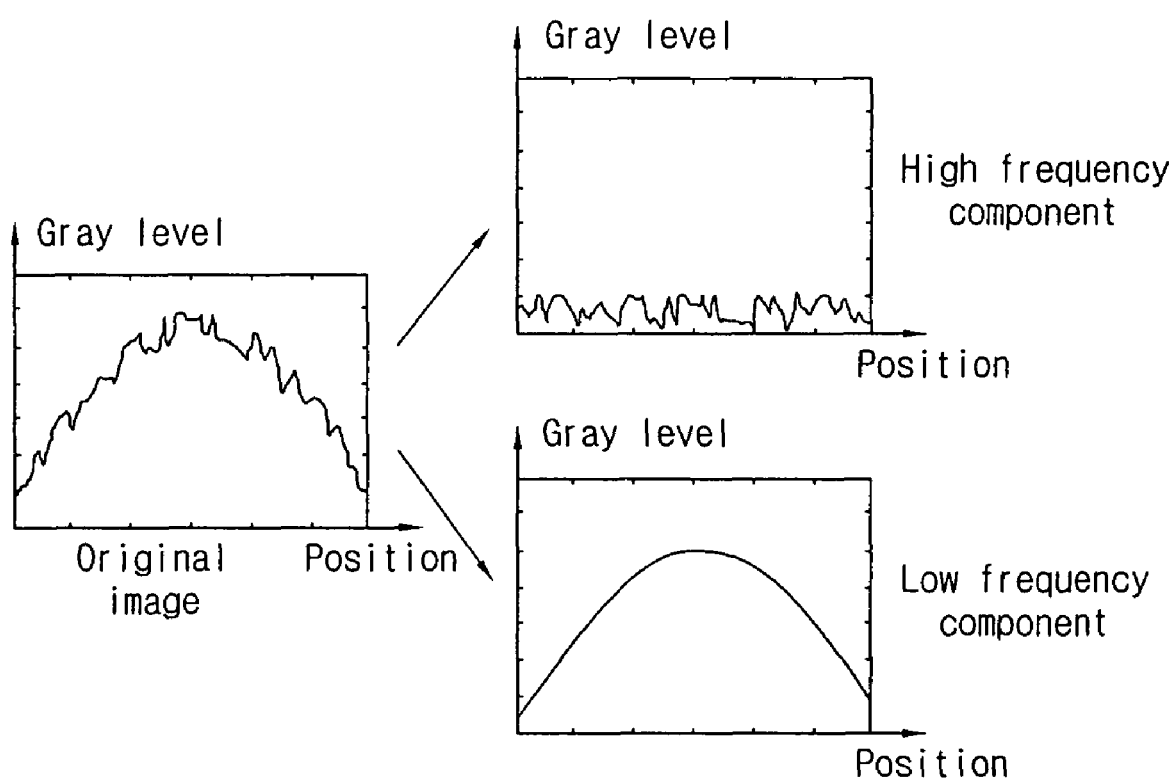
FIG. 7A is a graph showing a high frequency filtering method according to an embodiment of the present invention.

The calculated high frequency component is shown in FIG. 7A. As shown in FIG. 7A, the input video data is divided into the high frequency component and the low frequency component, and the high frequency component of the input video data is filtered by the high pass filter 31b.

Figure 7B:
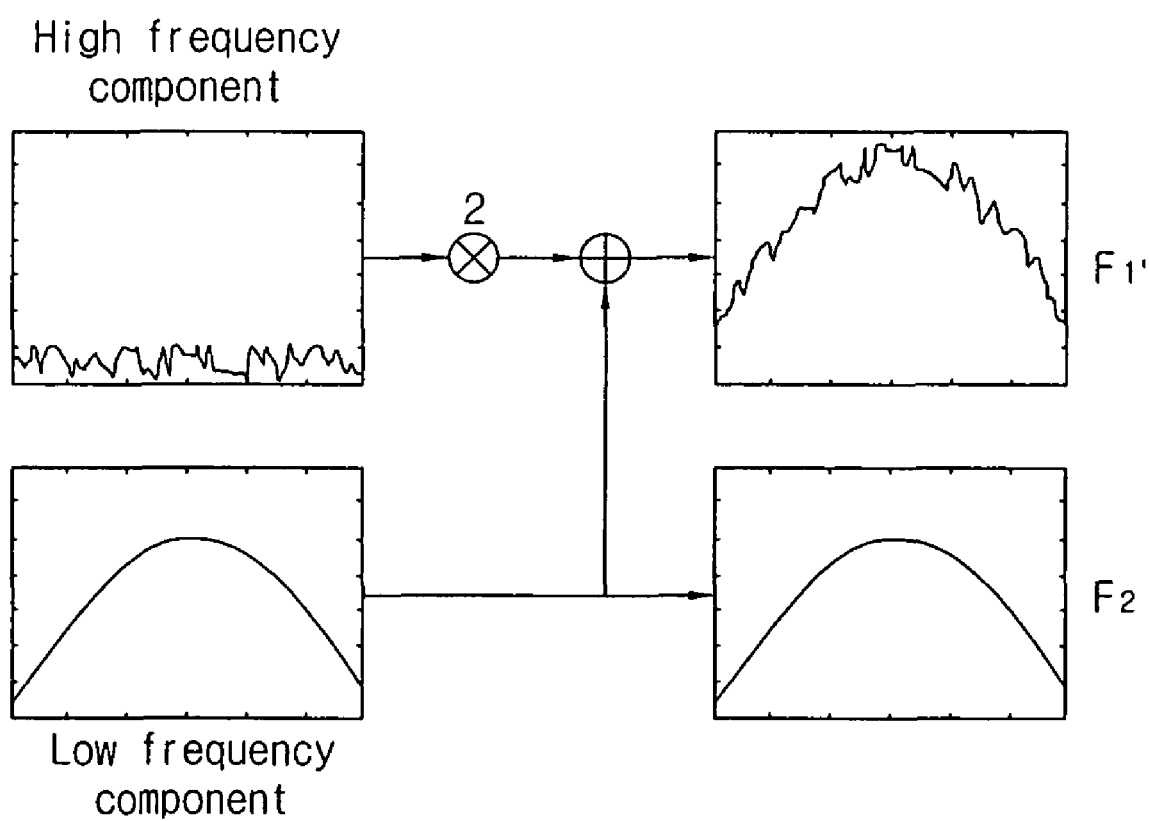
FIG. 7B is a graph showing the video data generating method according to an embodiment of the present invention.

Then, at operation S27, the calculated high frequency component is added to and subtracted from the original input video data through the video data generator 33, thereby creating the first video data and the second video data (refer to FIG. 7B). For example, the high frequency component of the first video data is doubled, and the second video data has only the low frequency component without the high-frequency component.

Here, because the gray levels of the first and second video data are not linear to the gray of the panel, at operation S29, at least one of the first video data and the second video data is compensated by referring to the LUT in order to compensate this non-linearity.

Thus, in the display apparatus according to an embodiment of the present invention and the control method thereof, very few operations are required to minimize the motion blur as compared with the conventional display apparatus. Further, there is no necessity for changing the backlight module and the cell design. Also, when the control method according to an embodiment of the present invention is applied together with the overdrive method for reducing the response time of the liquid crystal, the motion blur is more effectively decreased.

FIG. 9 is a control flowchart of a display apparatus according to another embodiment of the present invention. Below a display apparatus according to another embodiment of the present invention will be described, and repetitive description to the first embodiment will be avoided whenever possible.

As shown in FIG. 9, at operation S30, input video data is analyzed into an AC component and a DC component. At operation S31, the DC component and the AC component are compensated by a limitation method, thereby preventing an overflow of a gray level.

At operation S33, first video data is created by adding the DC component to the double AC component, and second video data is created with only the DC component. At operation S35, the created first and second video data is compensated, referring an LUT.

In the first embodiment, when the gain value α of the high frequency component is set as 1, the high frequency signal is removed. Therefore, the second video data can be regarded as a DC frame. Further, the first video data has a doubled high frequency signal, so that the corresponding-frame is increased in the AC component.

In the foregoing embodiment, the color space of the video data is illustrated as YCbCr by way of example, but is not limited thereto. Alternatively, various color spaces may be applied to various embodiments of the present invention. Further, the high frequency calculating method and the high frequency component increment may vary.

As described above, embodiments of the present invention provide a display apparatus and a control method thereof, in which input video data is analyzed into frequency components, and new first and second video data is created and outputted in sequence, so that a motion blur is decreased through simple operations without a hardware change.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
    a display panel including a display;
    a controller to analyze input video data into frequency components, and create first and second video data different in the frequency component from each other on the basis of analyzed results;
    a high frequency calculator to filter a high frequency component from the input video data, and a video data creator to create the first video data by adding the high frequency component to the input video data and the second video data by subtracting the high frequency component from the input video data; and
    a panel driver to drive the created first and second video data to be displayed in sequence as images on the display panel, wherein
    the display displays the first and second video data in sequence according to the panel driver.

2. The display apparatus according to claim 1, wherein the high frequency calculator comprises a high pass filter.

3. The display apparatus according to claim 2, wherein the high frequency calculator comprises an area selector to select a predetermined area centering a pixel of which the high frequency component is calculated, and the high pass filter calculates the high frequency component of the pixel on the basis of video data corresponding to the selected area.

4. The display apparatus according to claim 2, wherein the high frequency calculator comprises a gain adjuster to adjust a gain value of the high frequency component on the basis of a predetermined gain value.

5. The display apparatus according to claim 4, wherein the high frequency calculator comprises a high frequency compensator to compensate the high frequency component by a predetermined limitation method.

6. The display apparatus according to claim 2, wherein the high frequency calculator comprises a high frequency compensator to compensate the high frequency component by a predetermined limitation method.

7. The display apparatus according to claim 1, wherein the controller comprises a video data compensator to compensate at least one of the first video data and the second video data with reference to a predetermined lookup table.

8. The display apparatus according to claim 7, wherein the video data compensator compensates at least one of the first and second video data by an interpolation method with reference to the lookup table.

9. The display apparatus according to claim 1, wherein the panel driver drives the first and second video data to be processed at double frame rate and outputted in sequence.

10. The display apparatus according to claim 1, further comprising a first color space converter to convert the input video data to have a linear color space when the input video data has a nonlinear color space; and a second color space converter to convert the created first and second video data to have an original color space.

11. The display apparatus according to claim 1, further comprising a video data duplicator to duplicate the input video data.

12. A method of controlling a display apparatus, comprising:
    analyzing input video data into frequency components;
    filtering a high frequency component from the input video data;
    creating a new first video data by adding the high frequency component to the input video data;
    creating a new second video data different in the frequency component from the new first video data by subtracting the high frequency component from the input video data
    outputting the created new first and new second video data in sequence; and
    displaying the created new first and new second video data in sequence.

13. The method according to claim 12, wherein the filtering the high frequency component step comprises selecting a predetermined area centering a pixel of which the high frequency component is calculated, and the high frequency component of the pixel is calculated on the basis of video data corresponding to the selected area.

14. The method according to claim 13, further comprising adjusting a gain value of the high frequency component on the basis of a predetermined gain value.

15. The method according to claim 14, further comprising compensating the high frequency component by a predetermined limitation method.

16. The method according to claim 15, further comprising compensating at least one of the first video data and the second video data with reference to a predetermined lookup table.

17. The method according to claim 16, wherein the compensating at least one of the first and second video data step comprises compensating at least one of the first and second video data by an interpolation method with reference to the lookup table.

18. The method according to claim 12, wherein the first and second video data is processed at a double frame rate and outputted in sequence.

19. The method according to claim 12, further comprising converting the input video data to have a linear color space when the input video data has a nonlinear color space, wherein the creating the first and second video data comprises converting the created first and second video data to have an original color space.

20. The method according to claim 12, further comprising duplicating the input video data.

21. A method of controlling a display apparatus, comprising:
    analyzing input video data into an AC component and a DC component;
    creating first video data by adding the DC component to the doubled AC component, and second video data with the DC component;
    sequentially outputting the first and second video data processed at a double frame rate; and
    displaying the sequentially outputted first and second video data in sequence.

22. The method according to claim 21, further comprising compensating at least one of the first video data and the second video data with reference to a predetermined lookup table.

23. The method according to claim 22, wherein the analyzing the input video data into the AC component and the DC component step comprises selecting a predetermined area centering a corresponding pixel, and
    the DC component of the pixel is calculated on the basis of video data corresponding to the selected area, and the AC component is calculated by subtracting the calculated DC component from the input video data.

24. The method according to claim 23, wherein the analyzing the input video data into the AC component and the DC component step comprises compensating the calculated DC and AC components by a predetermined limitation method.

* * * * *